United States Patent [19]
Hewette et al.

[11] Patent Number: 5,341,654
[45] Date of Patent: Aug. 30, 1994

[54] SUCTION GAS CONDUIT

[75] Inventors: Chip Hewette, Troy; Hubert Bukac, Sidney, both of Ohio

[73] Assignee: Copeland Corporation, Sidney, Ohio

[21] Appl. No.: 49,985

[22] Filed: Apr. 16, 1993

[51] Int. Cl.⁵ ............................................. F25D 19/00
[52] U.S. Cl. ........................................ 62/296; 181/229; 181/403; 417/312
[58] Field of Search .............. 62/296; 181/229, 403; 417/312

[56] References Cited

U.S. PATENT DOCUMENTS

| | | | |
|---|---|---|---|
| 2,297,046 | 9/1942 | Bourne | 181/48 |
| 2,986,017 | 5/1961 | Betts | 62/217 |
| 3,263,772 | 8/1966 | Irwin et al. | 181/59 |
| 3,698,840 | 10/1972 | Hover | 417/312 |
| 3,763,659 | 10/1973 | Hover | 062/296 X |
| 3,864,064 | 2/1976 | Gannaway | 417/312 |
| 3,876,339 | 4/1976 | Gannaway | 417/312 |
| 4,239,461 | 12/1980 | Elson | 417/312 |
| 4,313,715 | 2/1982 | Richardson, Jr. | 417/312 |
| 4,325,458 | 4/1982 | Bschorr et al. | 181/227 |
| 4,370,104 | 1/1983 | Nelson et al. | 417/312 |
| 4,401,418 | 8/1983 | Fritchman | 417/312 |
| 4,417,868 | 11/1983 | Putnam | 181/229 X |
| 4,418,443 | 12/1983 | Fischer | 15/326 |
| 4,472,949 | 9/1984 | Fujisawa et al. | 62/473 |
| 4,582,468 | 4/1986 | Bar | 417/312 |
| 4,693,339 | 9/1987 | Beale et al. | 181/229 X |
| 4,715,790 | 12/1987 | Iijima et al. | 417/269 |
| 4,755,108 | 7/1988 | Todescat et al. | 417/312 |
| 4,759,693 | 7/1988 | Outzen | 417/312 |
| 4,874,062 | 10/1989 | Yanagida et al. | 181/250 |
| 4,909,348 | 3/1990 | Harwood et al. | 181/282 |
| 5,129,793 | 7/1992 | Blass et al. | 417/312 |
| 5,173,034 | 12/1992 | Riffe | 417/312 |

FOREIGN PATENT DOCUMENTS 234383 1/1945 Switzerland.

*Primary Examiner*—William E. Tapolcai
*Attorney, Agent, or Firm*—Harness, Dickey & Pierce

[57] ABSTRACT

A refrigeration compressor incorporating an improved suction muffler is disclosed. The suction muffler provides dual sound attenuating chambers within a single housing, which housing is secured to the suction inlet conduit extending between the motor cover and suction inlet for the compressor. The suction inlet conduit is increased in diameter between the motor cover and the compressor inlet to provide a stepped portion which operates to reflect pressure waves. Integrally formed openings in the sidewall of the conduit provide communication with each of the two chambers and the respective chambers may be tuned to attenuate different specific frequencies. Internal integrally formed baffles within each of the chambers serve to reduce standing waves within the chambers as well as adding stiffness to the muffler.

24 Claims, 5 Drawing Sheets

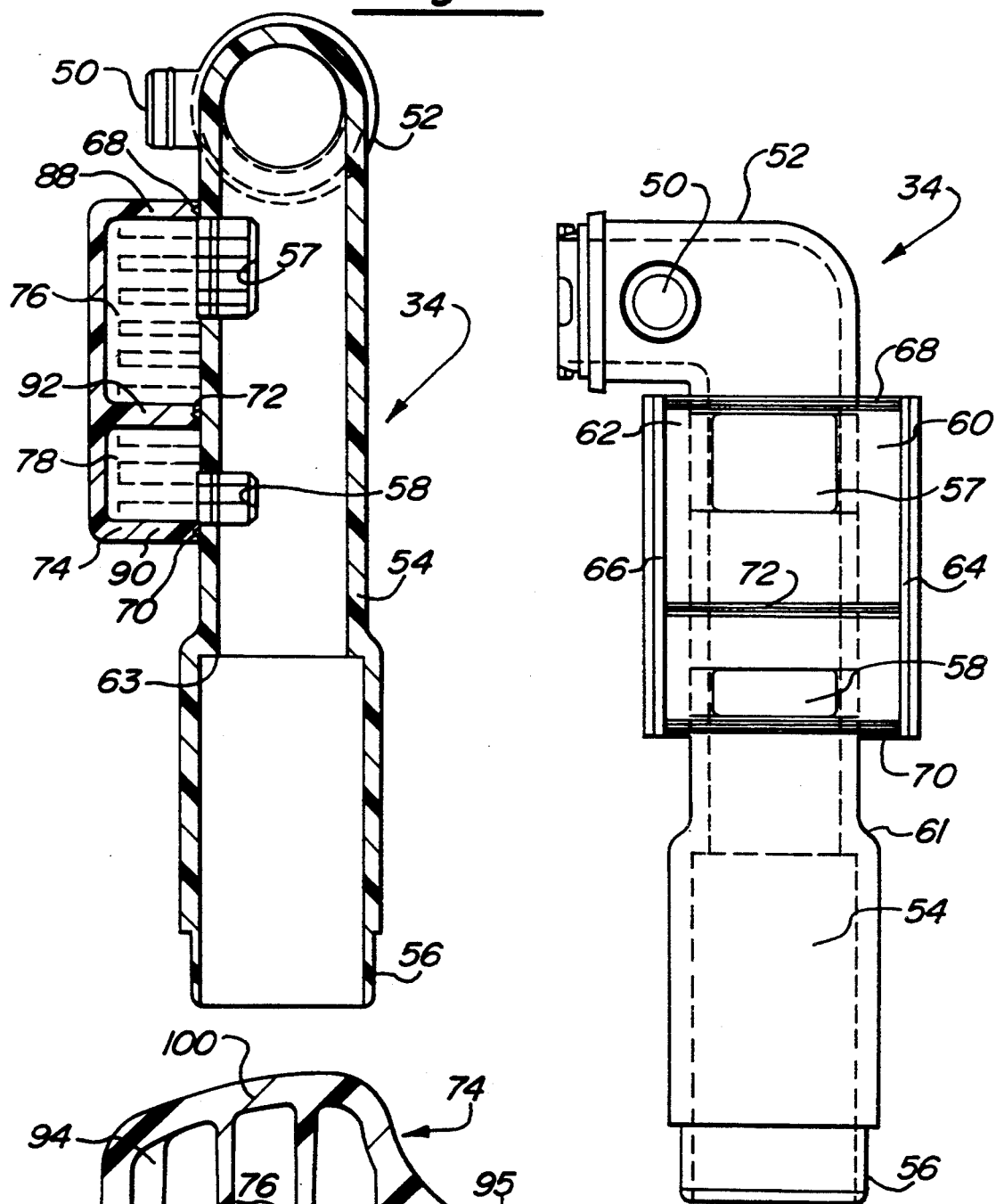

SUCTION GAS CONDUIT

FIELD OF THE INVENTION

The present invention relates generally to refrigeration compressors and more specifically to such refrigeration compressors of the reciprocating piston type which employ a suction gas muffler for attenuating noise resulting from the operation thereof.

BACKGROUND AND SUMMARY OF THE INVENTION

In design of high efficiency compressors, it is important to provide relatively unrestricted suction gas flow to the compressor. However, this suction process results in the generation of substantial noise due both to the rapid flow of suction gas into the compressor as well as the operation of the intake valving. Accordingly, it is desirable to provide some form of noise attenuating means in the suction gas flowpath. The use of various forms of restrictors and baffles in the main flowpath of the suction gas is undesirable in that such devices may create excessive flow losses requiring that larger conduits be utilized to prevent compressor suction starvation.

Present practice requires the design of compressors to be as compact as possible. The available space within the assembly thus imposes several constraints on the size of suction mufflers. Further, because of these space limitations, it is often necessary to extend the suction gas conduit in close proximity to the discharge muffler and conduits. The discharge gas is relatively hot due to the compression process and in order to maintain a high volumetric efficiency, it is desirable to minimize heat transfer from the discharge gas to the suction gas.

Accordingly, the present invention provides a refrigeration compressor having an improved suction gas muffler which effectively attenuates noise generated from the above-mentioned sources while still enabling relatively free unrestricted flow to the compressor.

The suction gas muffler of the present invention is similar to the suction muffler described in assignee's U.S. Pat. No. 5,129,793 with the exception of the incorporation of a step located on the internal diameter of the suction gas muffler. The step on the internal diameter of the muffler increases the size of the internal diameter in the direction of flow of the suction gas. This stepped internal diameter of the suction gas muffler produced dramatic performance improvements with no sound penalty. This surprising improvement in performance is the result of changes in various factors including: the acoustic characteristics of the suction process; pressure waves from the head are restricted from moving against the gas flow towards the motor cover; and the suction pressure wave is brought more in phase with the piston motion thus reducing the suction work required.

The suction gas muffler of the present invention is of the side branch type and comprises a relatively large diameter stepped conduit having a housing secured thereto which defines a pair of side branch chambers each of which may be tuned to a different fundamental frequency. A pair of longitudinally spaced openings provide communication with each of the respective chambers and serves to define an impedance tube therebetween which may be tuned to attenuate a third fundamental frequency. Integrally formed baffles and ribs within each of the chambers further aid in noise attenuation by reducing standing waves within the chambers as well as enhancing the rigidity of the muffler. The muffler is preferably fabricated from a polymeric composition so as to minimize heating of the suction gas being supplied to the compressor. Further, the use of such materials enables the suction conduit and muffler to be very inexpensively fabricated by suitable forming means such as, for example, injection molding.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a section view of the suction conduit and associated muffler incorporated in the refrigeration compressor of FIG. 1;

FIG. 4 is a view in elevation of the suction conduit of FIG. 3 with the muffler housing removed;

FIG. 6 is a section view of the housing of FIG. 5, the section being taken along line 6—6 thereof;

DESCRIPTION OF THE PREFERRED EMBODIMENT

Figure 1:
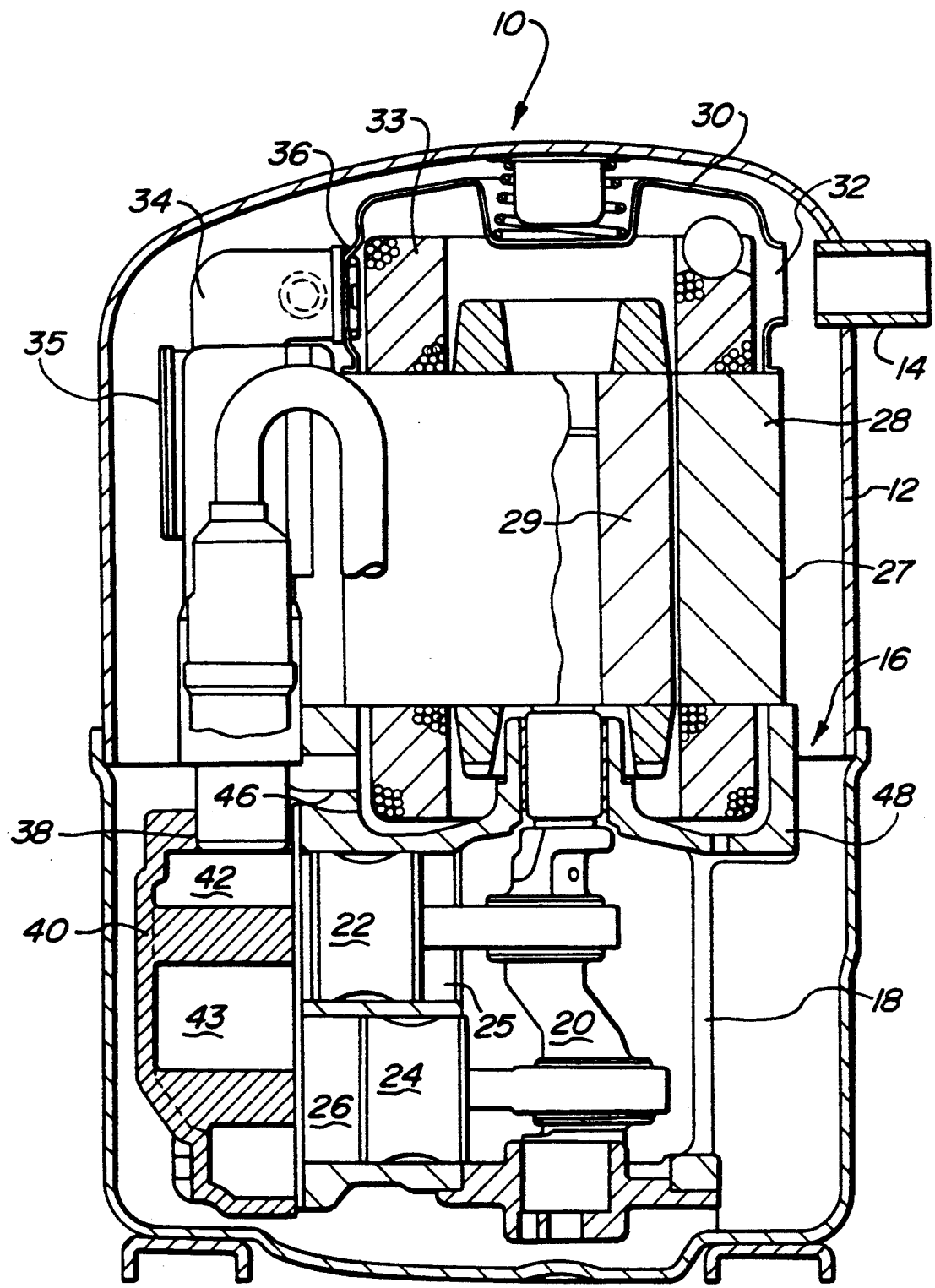
FIG. 1 is a section view of a refrigeration compressor in accordance with the present invention.

Referring now to the drawings and in particular to FIG. 1, there is shown a refrigeration compressor of the hermetic reciprocating piston type indicated generally at 10. Refrigeration compressor 10 includes an outer shell 12 having a suction inlet 14 and a motor compressor assembly 16 resiliently mounted therein.

Motor compressor 16 includes a compressor housing 18 having a crankshaft 20 rotatably journaled therein and operative to reciprocate pistons 22 and 24 within respective cylinders 25, 26. A motor assembly 27 includes a stator 28 having a lower end secured to compressor housing 18 and a rotor 29 secured to crankshaft 20 so as to rotatably drive same. A motor cover 30 is secured to and encloses the upper end of stator 28 and includes an outwardly flared suction inlet opening 32 positioned in spaced aligned facing relationship to suction inlet 14. As shown, opening 32 is positioned relative to the stator end turns 33 such that the suction gas entering the motor cover will impinge on the end turns 33 so as to thereby separate out any liquid carried by the suction gas. Additionally, the spacing between inlet 14 and opening 32 enables liquid entering via inlet 14 to flow downwardly into the sump thus further helping to insure liquid refrigerant and/or lubricant will not be carried into the compression cylinders 25, 26.

Figure 2:
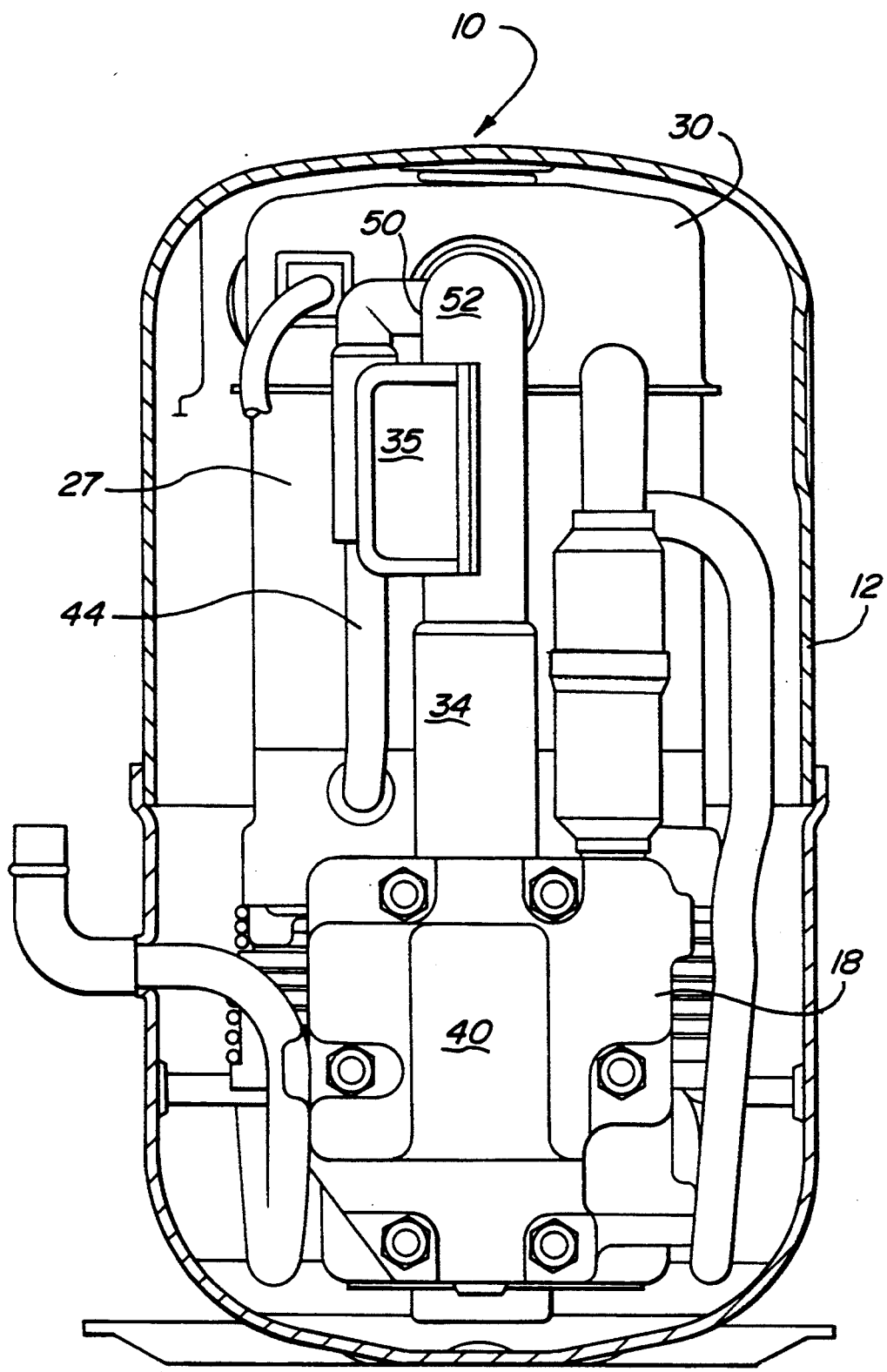
FIG. 2 is a view in elevation of the refrigeration compressor of FIG. 1 rotated approximately 90 degrees with the outer shell shown in section.

A suction conduit assembly 34 including a suction muffler portion 35 is also provided having one end fitted with an opening 36 provided in the sidewall of motor cover 30, the other end extending downwardly and fitted within an opening 38 provided in head 40 whereby suction gas is supplied to respective cylinders 25, 26 via suction chamber 42 and compressed gas is discharged therefrom into discharge chamber 43. As shown in FIG. 2, a bypass conduit 44 is also provided having one end fitted within an opening 46 provided in annular flange portion 48 of compressor housing 18. The other end of bypass conduit 44 extends upwardly alongside of suction muffler 34 and is fitted within an opening 50 provided in the sidewall of upper conduit portion 52 of suction conduit assembly 34. Preferably both suction conduit assembly 34 and bypass conduit 44 will be fabricated from a material having a relatively low coefficient to heat transfer such as a polymeric composition so as to minimize the heating of the suction gas flowing to the compressor. Suction conduit assembly 34 is similar to the suction muffler described in assignee's U.S. Pat. No. 5,129,793 the disclosure of which is hereby incorporated herein by reference.

Referring now to FIGS. 3 and 4, suction conduit assembly 34 comprises an elongated generally cylindrically shaped tubular member 54 having a generally 90 degree bend at the upper end 52 thereof which, as noted above, is designed to be fitted within an opening 36 provided in motor cover 30. The lower end of conduit assembly 34 includes a reduced diameter portion 56 adapted to be received within opening 38 provided in head 40. A pair of longitudinally spaced cutout portions 57, 58 are provided in tubular member 54 intermediate the ends thereof, each of which extends circumferentially slightly less than 180 degrees. Cutout 57 has an axial length substantially greater than the axial length of cutout 58. Between the pair of cutout portions 57 and 58 and reduced diameter portion 56, the internal and external diameters of tubular member 54 are increased in diameter at 61. This increase in diameter provides a step 63 on the internal diameter of tubular member 54 which is operative to reflect pressure waves coming from the compressor cylinder inlet. In addition, this increase in diameter serves to reduce the suction work required of the compressor which thus improves the efficiency of the compressor. This reduction in suction work is accomplished due to the improved fluid flow and the acoustic tuning.

In the preferred embodiment, the increase in diameter should be located at a distance the compressor inlet end of the suction muffler which is greater than 20% of the total length of the muffler. The change in diameter is from smaller to larger in the direction of flow of the suction gas, and the diameter change ratio should be between 0.5 and 0.9. While the embodiment being designed includes a sudden increase in diameter having a generally 90° step and sharp corners, the present invention is not to be limited to this sudden increase or sharp corners as the corners could be radiused and a conical stepped angle could be used in place of the 90° step.

A pair of generally radially outwardly extending axially elongated flange portions 60, 62 are also integrally formed with tubular member 54 and extend generally radially outwardly from opposite sides thereof adjacent the opposite circumferential ends of cutout portions 57 and 58. The axial length of flange portions 60 and 62 is sufficient such that they extend slightly above and below cutout portions 57 and 58, respectively. A pair of relatively small axially extending locating and securing ribs 64, 66 project outwardly from each flange portion 60, 62 adjacent their outer edges and extend over the entire length thereof. Additionally, a pair of relatively small generally V-shaped ribs 68, 70 extend laterally across respective flange portions 60, 62 as well as across tubular member 54 adjacent the opposite ends of flange portions 60, 62. A third relatively small rib 72 also extends laterally across flange portions 60, 62 and across tubular member 54 intermediate ribs 68, 70. As shown, rib 72 will be positioned somewhat closer to rib 70 than rib 68.

Figure 5:
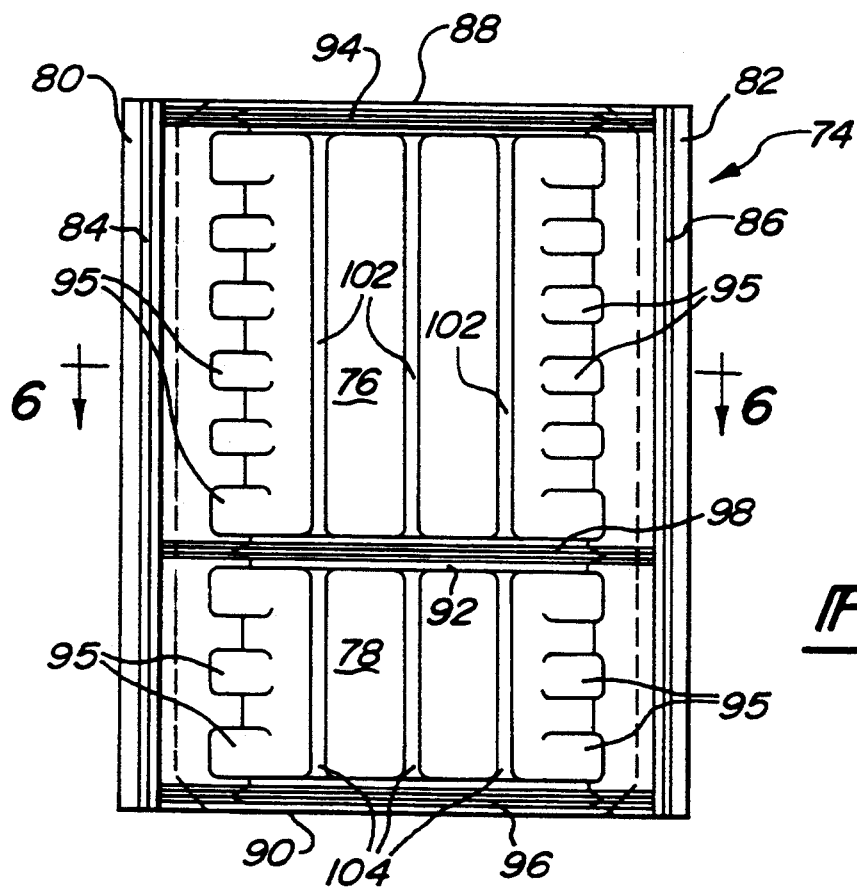
FIG. 5 is a view in elevation of the muffler housing forming a part of the suction muffler assembly in accordance with the present invention.
Figure 7:
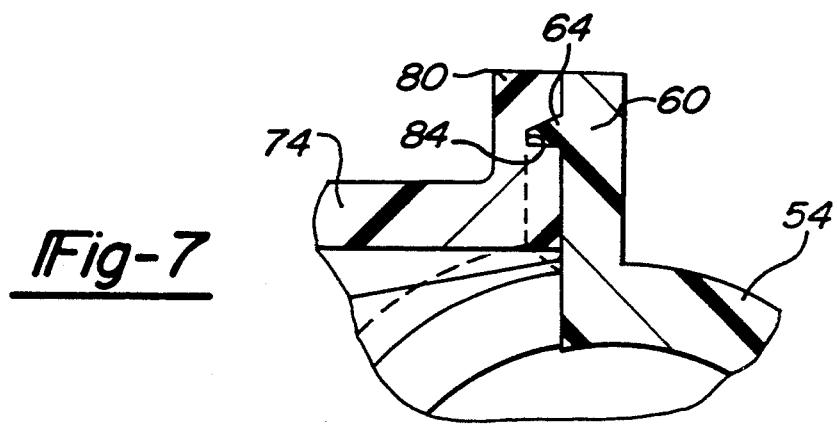
FIG. 7 is an enlarged fragmentary section view of a portion of the suction conduit and muffler housing showing one of the joints therebetween.

A muffler housing 74 is provided which is adapted to be secured to flanges 60, 62 of tubular member 54 and cooperates therewith to define a pair of sound attenuating chambers 76, 78 each of which communicates with the interior of tubular member 54 via respective cutouts 57, 58. As best seen with reference to FIGS. 5 and 6, muffler housing 74 is generally rectangular in shape and includes a pair of elongated laterally extending flange portions 80, 82 which are designed to mate with respective flange portions 60, 62 provided on tubular member 54. To this end, longitudinally extending notches 84, 86 are provided on each of flange portions 80, 82 which are designed to receive respective ribs 64 and 66 provided on flange portions 60, 62. As shown in FIG. 7, respective flanges 60, 80; 62, 82 as well as associated ribs and notches 64, 84; 66, 86 will preferably be secured together by means of ultrasonic welding so as to provide a secure substantially fluid-tight sealing relationship therebetween.

In order to close off and seal the opposite ends of respective chambers 76, 78 both from direct communication with the interior of shell 12 as well as from direct communication with each other, a plurality of three flange portions are provided, flanges 88 and 90 being positioned at opposite ends of housing 74 and flange 92 being positioned therebetween. Each of flange portions 88, 90 and 92 includes an arcuate central portion adapted to mate with the outer surface of tubular member 54.

Figure 8:
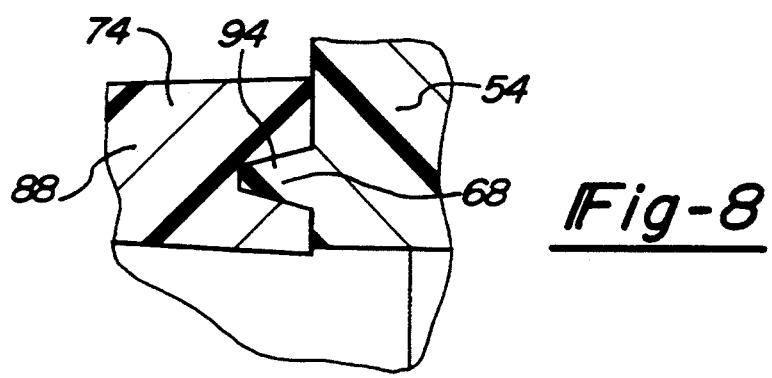
FIG. 8 is an enlarge fragmentary section view of another joint between the muffler housing and suction conduit.

Recesses 94, 96 and 98 are also provided extending along respective flanges 88, 90, 92 between ribs 84, 86 and across arcuate central portions thereof. As best seen with reference to FIG. 8, recess 94 is generally V-shaped in cross section and is adapted to receive rib 68 formed on tubular member 54. Preferably rib 68 will be flared to a slightly greater angle than the taper with which recess 94 is formed so as to provide a slight interference fit therebetween thus insuring a secure fluid-tight sealing relationship is created therebetween. Respective grooves 96 and 98 and ribs 70 and 72 will be similarly formed so as to also provide a secure substantially fluid-tight sealing relationship therebetween.

In order to increase the rigidity of housing 74, a plurality of reinforcing ribs 95 are provided on the interior thereof spaced along respective sidewalls 97 and 99 and extending between respective flange portions 80 and 82 and end wall 100. Also, in order to reduce the possibility of standing waves being generally within either or both respective chambers 76 and 78, a plurality of longitudinally extending spaced baffles 102, 104 are provided therein which serve to divide respective chambers 76 and 78 into a plurality of subchambers each set of which communicates with the interior of tubular member via respective cutouts 57, 58. Preferably muffler housing 74 will be formed from a suitable polymeric composition similar to that from which tubular member 54 is formed so as to minimize heat transfer to suction gas being supplied to compressor 10.

It should be noted that both the axial width of cutouts 57 and 58 and the axial length of respective chambers 76 and 78 will be selected to enable them to attenuate two different fundamental frequencies. Preferably the smaller cutout 58 and associated smaller chamber 78 which are designed to attenuate higher frequencies will be positioned closer to the compressor than the larger cutout 57 and associated chamber 76. Additionally, as shown, cutout 57 is positioned immediately adjacent the upper end of muffler housing 74 while cutout 58 is positioned immediately adjacent the lower end of housing 74. This spacing enables that portion of tubular member 54 to act as an impedance tube tuned for a third fundamental frequency thereby further aiding in the effectiveness of the suction muffler and conduit assembly.

As may now be appreciated, the present invention provides an efficient relatively inexpensive suction muffler for a refrigeration compressor which is capable of attenuating a plurality of fundamental frequencies so as to thereby aid in providing an extremely quiet, efficient running compressor. Further, the use of a polymeric composition for fabrication of the suction conduit and associated muffler assembly minimizes the heating of the suction gas being supplied to the compressor thus aiding in the overall volumetric efficiency thereof.

The suction gas muffler of the present invention is similar to the suction muffler described in assignee's aforementioned U.S. Pat. No. 5,129,793 with the exception of the incorporation of the stepped internal diameter of the suction gas muffler. The step on the internal diameter of the muffler increases the size of the internal diameter in the direction of flow of the suction gas. This stepped internal diameter of the suction gas muffler produced dramatic performance improvements with no sound penalty. This surprising improvement in performance is the result of change in various factors including: the acoustic characteristics of the suction process; pressure waves from the head are restricted from moving towards the motor cover; and the suction pressure wave is brought more in phase with the piston motion thus reducing the suction work required.

Figure 9:
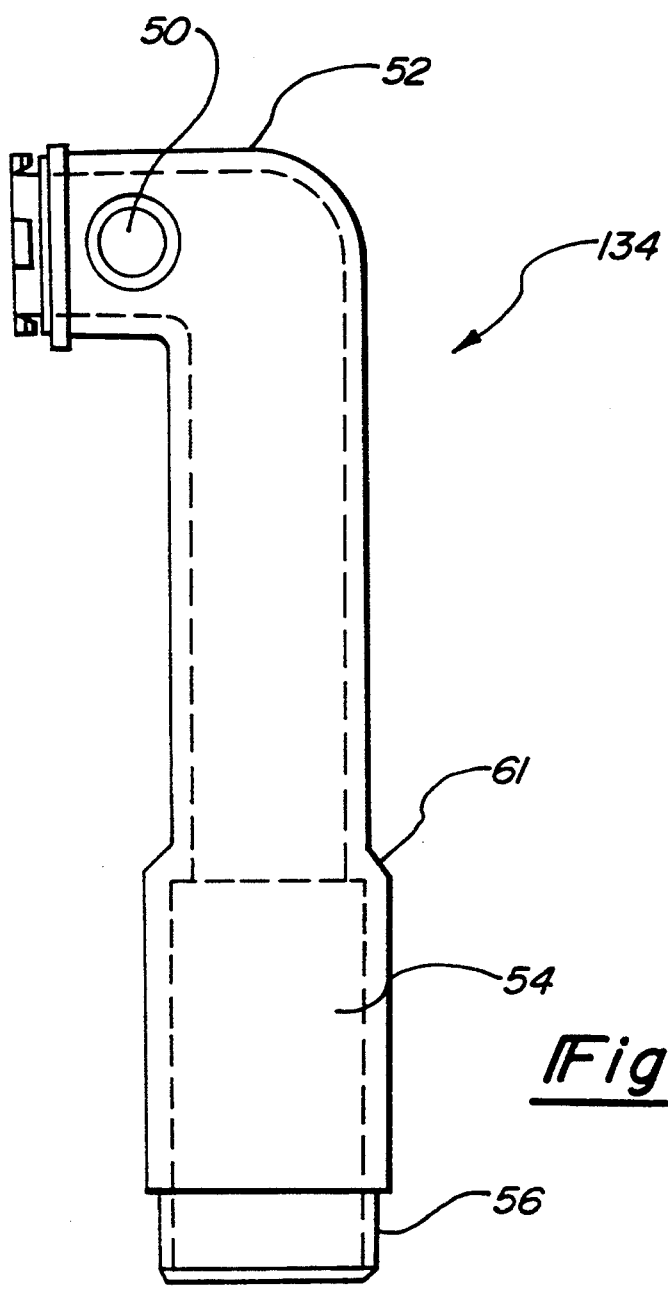
FIG. 9 is a view in elevation of a suction conduit according to another embodiment of the present invention.

Referring now to FIG. 9, a suction gas conduit 134 is shown according to another embodiment of the present invention. Suction conduit 134 is similar to suction conduit 34 with the exception of suction muffler portion 35, which has been eliminated. The remaining details of suction conduit 134 are similar to suction conduit 34 including opening 50 provided in the sidewall of upper conduit portion 52, elongated generally cylindrical shaped tubular member 54, reduced diameter portion 56 and the increase in diameter at 61 of the internal and external diameters of tubular member 54. Suction gas conduit 134 provides an unrestricted suction gas flow to compressor 10.

While the above detailed description describes the preferred embodiment of the present invention, it should be understood that the present invention is susceptible to modification, variation and alteration without deviating from the scope and fair meaning of the subjoined claims.

What is claimed is:

1. A refrigeration compressor comprising:
an outer shell defining an internal cavity;
compressor means disposed within said internal cavity;
motor means within said internal cavity drivingly connected to said compressor means; and
elongated suction conduit means having a first end secured to said compressor means and a second end open to said internal cavity of said shell, said suction conduit being operative to define a relatively unrestricted suction gas flowpath from said internal cavity of said shell to said compressor means, said conduit having a first internal cross sectional area at said first end and a second internal cross sectional area at said second end, said first cross sectional area being larger than said second cross sectional area.

2. A refrigeration compressor as set forth in claim 1 further comprising muffler means secured to said suction conduit, said muffler means including a first sound attenuating chamber communicating with said suction gas flowpath and a second sound attenuating chamber in fluid communication with said suction gas flowpath.

3. A refrigeration compressor as set forth in claim 2 wherein said suction conduit and said muffler means are fabricated from a polymeric composition.

4. A refrigeration compressor as set forth in claim 1 wherein said increase in cross sectional area of said conduit forms a generally 90° step.

5. In a refrigeration compressor including:
an outer hermetic shell;
compressor means within said shell;
motor means within said shell and operatively connected to said compressor means for driving same, an improved suction muffler assembly comprising an elongated suction conduit having a first end connected to said compressor means and a second end open to the interior of said shell, said conduit being operative to supply suction gas from the interior of said shell to said compressor means, said conduit having a first internal cross sectional area at said first end and a second internal cross sectional area at said second end, said first cross sectional area being larger than said second cross sectional area, said conduit further including first and second axially spaced openings in the sidewall intermediate the ends thereof, and a pair of generally radially extending axially elongated flanges, each of said flanges including a longitudinally extending rib thereon, a muffler housing secured to said suction conduit in overlying relationship to said pair of axially spaced openings, said muffler housing having a pair of outwardly extending flanges provided thereon, each having an elongated groove adapted to receive one of said ribs, said ribs and said notches cooperating to secure said muffler housing to said conduit, said muffler housing including laterally extending partition means cooperating with said suction conduit to define first and second substantially closed chambers within said muffler housing, said first chamber being in fluid communication with said suction gas flowpath via said first opening and said second chamber being in fluid communication with said suction gas flowpath via said second opening, said first and second chambers being operative to attenuate noise resulting from operation of said compressor means.

6. A refrigeration compressor as set forth in claim 5 wherein said increase in cross sectional area of said conduit forms a generally 90° step.

7. A refrigeration compressor as set forth in claim 5 wherein said muffler housing has upper and lower end walls, said end walls and said partition means each having a generally V-shaped recess extending thereacross, said conduit further includes laterally extending ribs adapted to be received within respective ones of said V-shaped recesses and to cooperate therewith to create a substantially fluid-tight sealing relationship therebetween.

8. A refrigeration compressor as set forth in claim 7 wherein said suction conduit and said muffler housing are fabricated from a polymeric composition.

9. In a refrigeration compressor including:
an outer hermetic shell;
compressor means within said shell;
motor means within said shell and operatively connected to said compressor means for driving same, an improved suction muffler assembly comprising an elongated suction conduit having a first end connected to said compressor means and a second end open to the interior of said shell, said conduit being operative to supply suction gas from the interior of said shell to said compressor means; said conduit having a first internal cross sectional area at said first end and a second internal cross sectional area at said second end, said first cross sectional area being larger than said second cross sectional area, said conduit further including first and second axially spaced openings in the sidewall intermediate the ends thereof;
a muffler housing secured to said suction conduit in overlying relationship to said pair of axially spaced openings, said muffler housing including laterally extending partition means cooperating with said suction conduit to define first and second substantially closed chambers within said muffler housing, each of said chambers having a length extending in the direction of the axis of said suction conduit, said first chamber being in fluid communication with said suction gas flowpath via said first opening and said second chamber being in fluid communication with said suction gas flowpath via said second opening, and a plurality of substantially parallel spaced baffles disposed within each of said first and second chambers, each of said baffles having a length substantially equal to the length of said first and second chambers, respectively, said first and second chambers being operative to attenuate noise resulting from operation of said compressor means.

10. A refrigeration compressor as set forth in claim 9 wherein said increase in cross sectional area of said conduit forms a generally 90° step.

11. A refrigeration compressor as set forth in claim 9 wherein said first opening communicates with said first chamber adjacent one end of said muffler housing and said second opening communicates with said second chamber adjacent the opposite end of said muffler housing.

12. A refrigeration compressor as set forth in claim 11 wherein said first chamber operates to attenuate a first fundamental frequency, said second chamber operates to attenuate a second fundamental frequency and the portion of said suction conduit extending between said first and second openings defines an impedance tube operative to attenuate a third fundamental frequency.

13. A refrigeration compressor as set forth in claim 12 wherein said second frequency is higher than said first frequency and said second chamber is positioned closer to said compressor than said first chamber.

14. A refrigeration compressor as set forth in claim 12 wherein said first and second openings comprise circumferentially extending slots of different axial lengths.

15. A refrigeration compressor comprising:
an outer shell;
compressor means disposed within said shell;
motor means within said shell drivingly connected to said compressor means;
elongated suction conduit means having a first end secured to said compressor means and a second end open to the interior of said shell, said suction conduit being operative to define a relatively unrestricted suction gas flowpath from the interior of said shell to said compressor means, said conduit having a first internal cross sectional area at said first end and a second internal cross sectional area at said second end, said first cross sectional area being larger than said second cross sectional area; and
muffler means secured to said suction conduit intermediate the ends thereof, said muffler means including a first sound attenuating chamber having a length extending in a direction parallel to the axis of said suction gas flowpath and a second sound attenuating chamber having a length extending in a direction parallel to the axis of said suction conduit and in fluid communication with said suction gas flowpath and a plurality of baffles disposed within one of said chambers, said baffles having elongated generally planar surfaces extending along said length of said chamber and positioned in generally parallel spaced relationship to each other and to the longitudinal axis of said suction conduit.

16. A refrigeration compressor as set forth in claim 15 wherein said increase in cross sectional area of said conduit forms a generally 90° step.

17. A refrigeration compressor as set forth in claim 15 further comprising means preventing direct communication between said first and second chambers.

18. A refrigeration compressor as set forth in claim 15 wherein said first chamber is sized to attenuate a first predetermined fundamental frequency and said second chamber is sized to attenuate a fundamental frequency different than said first fundamental frequency.

19. A refrigeration compressor as set forth in claim 18 wherein said different fundamental frequency is higher than said first fundamental frequency and said second chamber is positioned closer to said one end of said suction conduit than said first chamber.

20. A refrigeration compressor as set forth in claim 15 wherein said plurality of baffles are disposed within said first chamber.

21. A refrigeration compressor as set forth in claim 20 further comprising a plurality of baffles within said second chamber.

22. A refrigeration compressor as set forth in claim 21 wherein said baffles extend in a direction generally parallel to the longitudinal axis of said suction conduit.

23. A refrigeration compressor as set forth in claim 15 wherein each of said baffles operate to divide said one of said chambers into a plurality of subchambers, each of said subchambers being in direct fluid communication with said suction gas flowpath.

24. A refrigeration compressor as set forth in claim 23 wherein said baffles operate to prevent direct fluid communication between said subchambers.

* * * * *